Sept. 25, 1928.  E. T. P. KOPATZ  1,685,364
ELECTRIC WATER HEATER
Filed Oct. 25, 1926

Erich T. P. Kopatz INVENTOR.

BY S. E. Thomas
ATTORNEY.

Patented Sept. 25, 1928.

1,685,364

UNITED STATES PATENT OFFICE.

ERICH T. P. KOPATZ, OF DEARBORN, MICHIGAN.

ELECTRIC WATER HEATER.

Application filed October 25, 1926. Serial No. 143,925.

My invention relates to an electric water heater, shown in the accompanying drawings and more particularly described in the following specification and claims.

Electric water heaters are in use employing a heating element and a manually operated switch, which when closed heats the water in a tank through which it flows and when sufficient hot water is obtained the switch must then be manually operated to break the circuit.

Electric heaters controlled by a thermostat have also been employed and when the water is heated to a certain degree the thermostatically controlled switch is opened, thereby cutting off the electric current leading to the heating element.

The purpose of the present invention however is to provide a device whereby water may be heated only when a hot water outlet valve is opened to discharge water into a bowl or tub—the passage of the water through the pipe automatically closing an electric switch in circuit with the heating element, the switch being automatically opened to break the circuit through the heating element when the valve is closed to shut off the discharge of water.

With the foregoing and other objects in view which will appear as the description proceeds, the invention further resides in the details of construction hereinafter described and claimed, it being understood that changes may be made in the precise embodiment of the invention herein disclosed without departing from the spirit of the same.

While this invention is applicable for use in connection with any or all the hot water discharge outlets of a building and may be automatically controlled upon opening and closing any of said hot water valves, the drawings show it employed only in connection with a lavatory, in which:—

Figure 1:
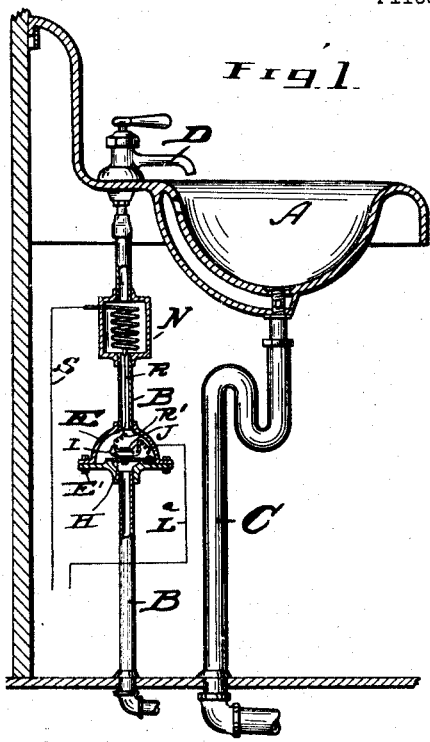
Figure 1 is a sectional elevation of a wash-bowl showing its water and sewer pipe connection, the discharge faucet, a heating element and diagrammatically an electric circuit between the heating element and a controlling switch—the water faucet being "closed" and the electric switch "open."
Figure 2:
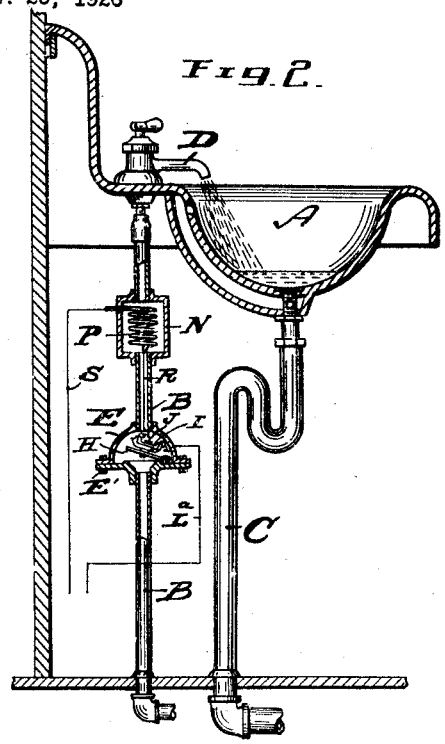
Figure 2 is a similar view showing the water discharge faucet "open" and the electric circuit through the heating element "closed" by the switch.
Figure 3:
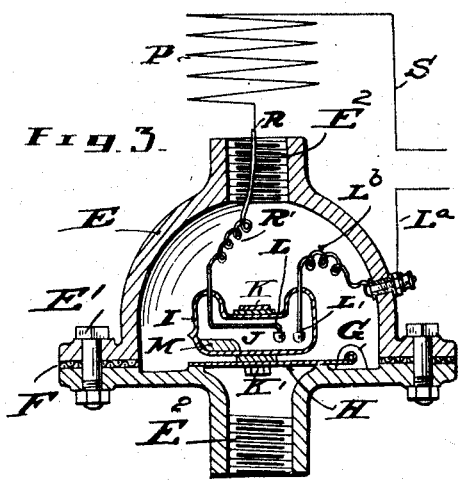
Figure 3 is an enlarged sectional view of the switch "open" as indicated in Figure 1.
Figure 4:
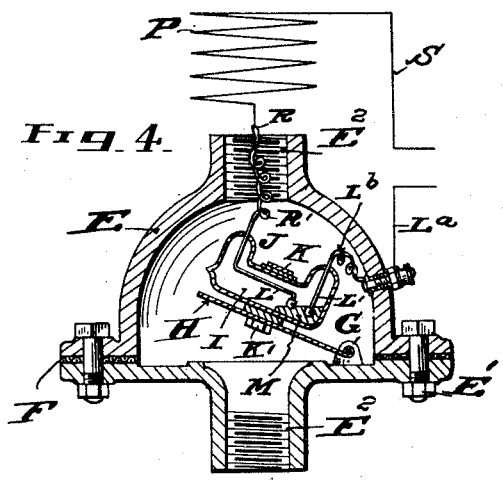
Figure 4 is an enlarged sectional view showing the swinging flap raised and the switch tilted to close the electric circuit through the heating element as in Figure 2.

Referring now to the letters of reference placed upon the drawings:

A represents a lavatory, B an inlet pipe from a water supply system, C a discharge pipe for connecting the wash-bowl with a sewer system. D is a valve or faucet controlling the discharge of water into the bowl. E is a divided chambered fitting bolted together as at $E^1$, with an annular gasket F interposed between the flanges of the fitting to insure a water-tight joint. The fitting E is tapped at $E^2$, $E^2$ to receive the ends of the water inlet pipe B. Pivoted to lugs G and overlapping the inlet orifice through the lower portion of the fitting is a swinging flap H, seated by gravity when the discharge valve D is closed. Mounted upon the flap H is a glass tube I housing a mercury switch J secured to the flap by an encircling band K—its threaded ends being engaged by a nut $K^1$. L and $L^1$ are terminal wires extending into the tube of the switch and M is a globule of mercury lodged in the tube adapted when the flap H is raised by the pressure and flow of water through the pipe when the discharge faucet is opened to close the circuit between the end of the terminals L and $L^1$—as shown in Figures 2 and 4.

Above the switch and in line with the water inlet pipe B is a fitting N, housing an electric heating element P, one end of which is connected through the wire R with the terminal L of the mercury switch,—a flexible connection $R^1$ being provided, whereby the switch may close and open in response to the opening and closing of the water valve or faucet D.

S is a wire connecting the heating element with a source of electrical energy and $L^a$ is a wire connecting the latter with the switch,—a flexible connection $L^b$ between it and the switch being provided that the switch may be free to open and close upon actuating the valve D.

Having indicated the several parts by reference letters, the construction and operation of the device will be readily understood.

Upon opening any of the discharge valves controlling the discharge of hot water, in which the heating element is installed, water flowing from the valve will raise the hinged flap H thereby tilting the electric switch, thus causing the globule of mercury in the tube to flow downwardly closing the circuit between the source of electrical supply and the heating element,—the water being thereby heated preceding its discharge from the faucet. Upon closing the faucet, the pressure in the water pipe above and below the flap H is equalized,—the flap H will then seat by gravity, automatically breaking the circuit through the switch between the electric heating element and the source of electrical energy.

Having thus described my invention what I claim is:

1. In a device of the character described, a water supply pipe; a valve controlling the delivery of water from the pipe; an electric heating element located in the water passage through the supply pipe; a chambered fitting connecting sections of the supply pipe; an electric switch contained within the chambered fitting; and means adapted to open and close said switch, actuated by the flow of water through the supply pipe upon opening and closing the discharge valve governing the discharge of water from said pipe.

2. In a device of the character described, a water supply pipe; a valve controlling the delivery of water from the pipe; an electric heating element located in the water passage through the supply pipe; a hinged switch supporting flap adapted to be raised by the water flowing through the pipe upon opening the discharge valve and to close by gravity when said valve is closed; and a mercury switch consisting of a tube mounted upon the hinged supporting flap and provided with interiorly projecting contacts; and a body of mercury contained within the tube and adapted when the flap is raised to automatically close the circuit through the heating element and to automatically break said circuit when the hinged supporting flap is closed.

3. In a device of the character described, a water supply pipe; a valve controlling the delivery of water from the pipe; an electric heating element located in the water passage of the supply pipe; a divided chambered fitting composed of upper and lower sections and connecting sections of the water supply pipe; a hinged flap carried by the lower section and adapted to be raised by the water flowing through the pipe upon the opening of the discharge valve and to close by gravity when the valve is closed; and a mercury switch comprising a tube mounted upon the hinged flap and provided with interiorly projecting contacts and a body of mercury contained within the tube and adapted when the flap is raised to automatically close the circuit through the heating element and to automatically break the circuit when the hinged flap is closed.

In testimony whereof, I sign this specification.

ERICH T. P. KOPATZ.